March 24, 1953  E. J. NEWCOMER  2,632,681
ARTICLE HANDLING MACHINE
Filed June 30, 1949  4 Sheets-Sheet 3
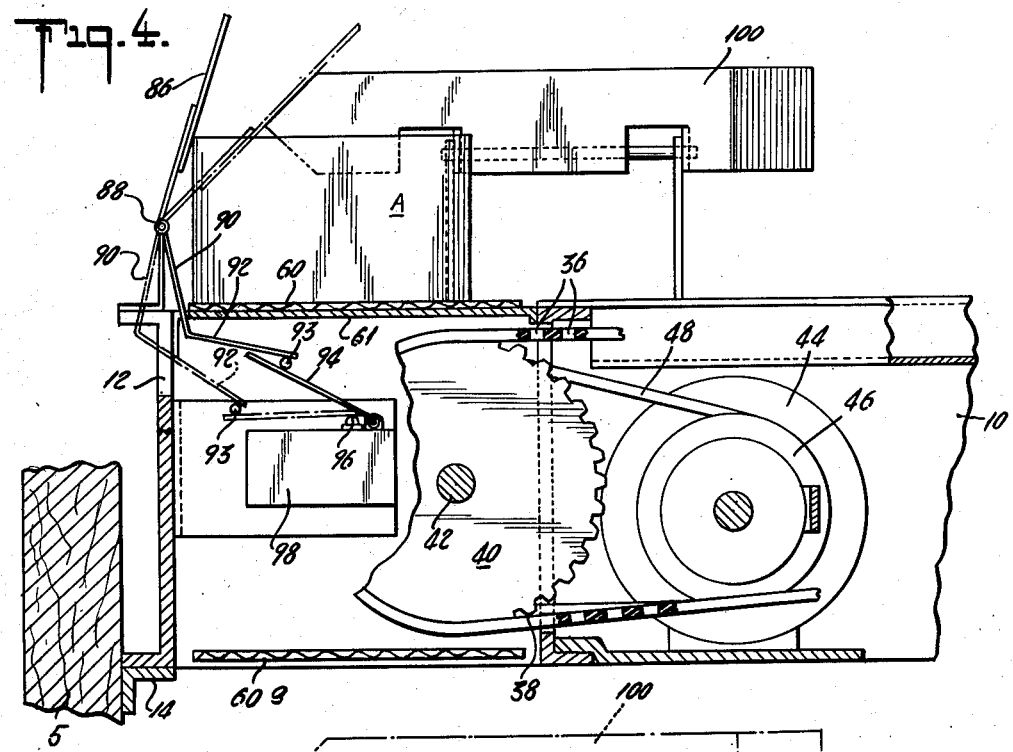
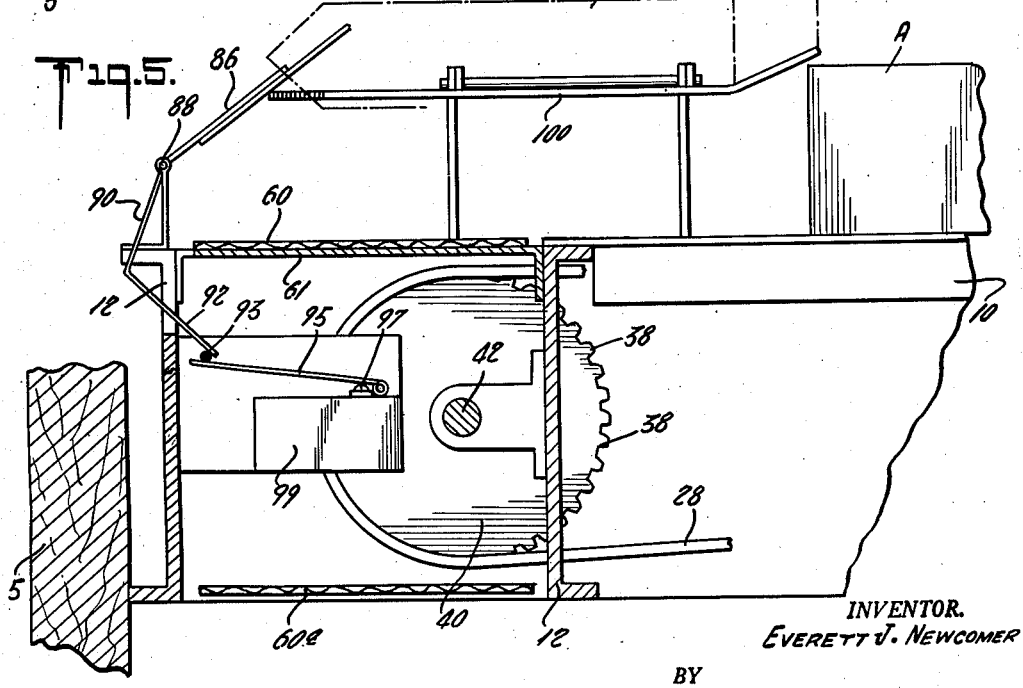
INVENTOR.
EVERETT J. NEWCOMER
BY
ATTORNEYS

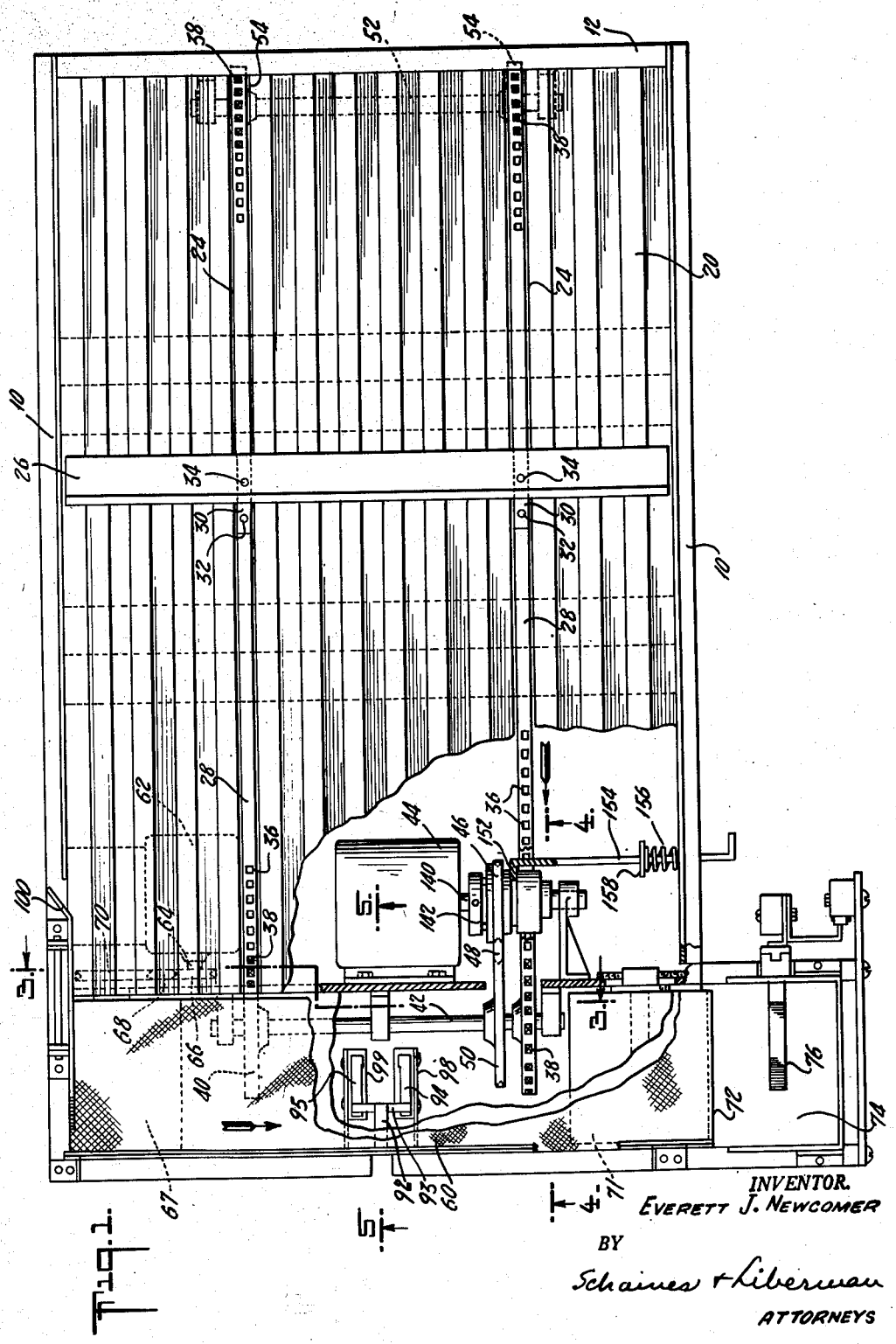

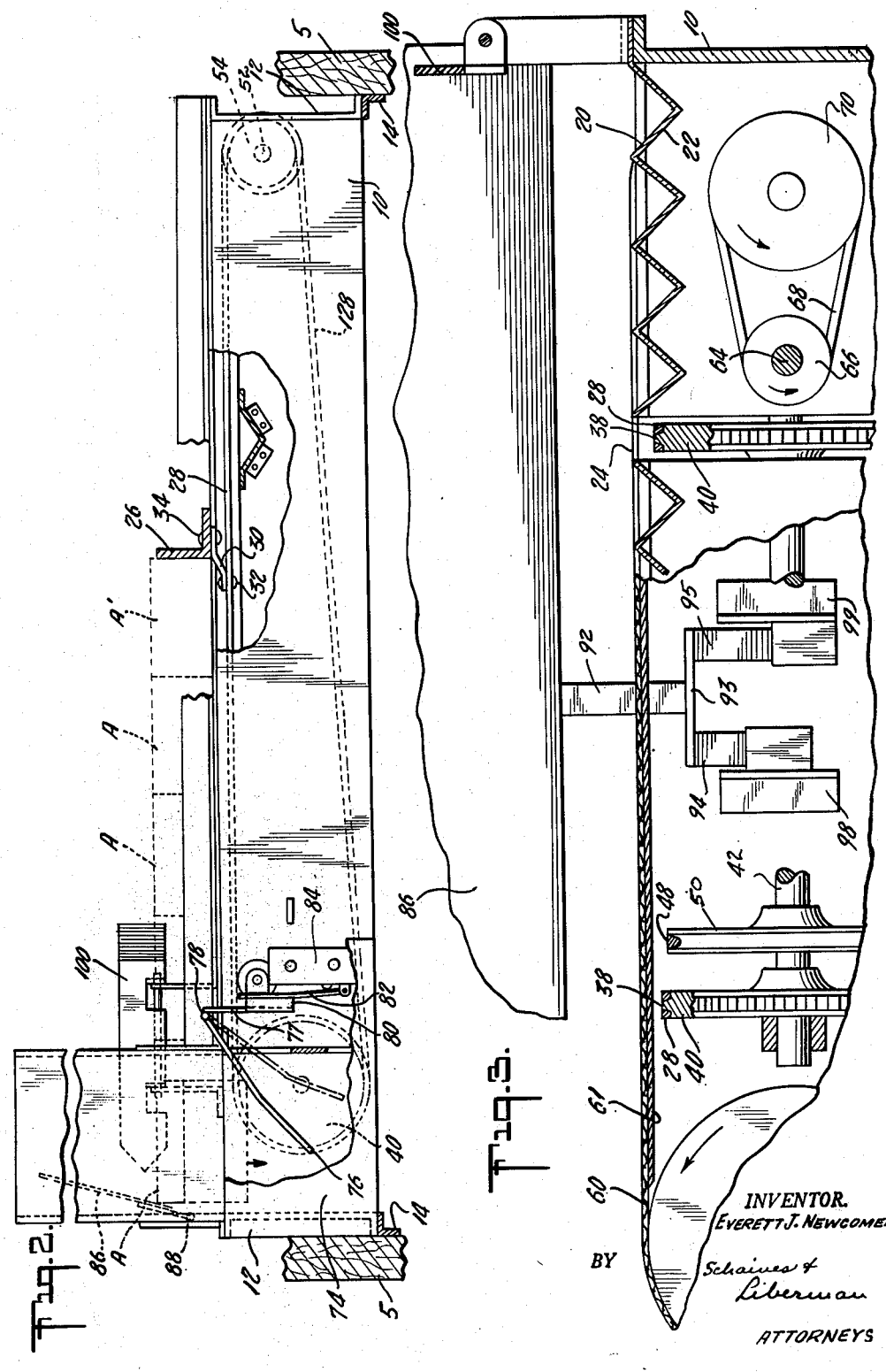

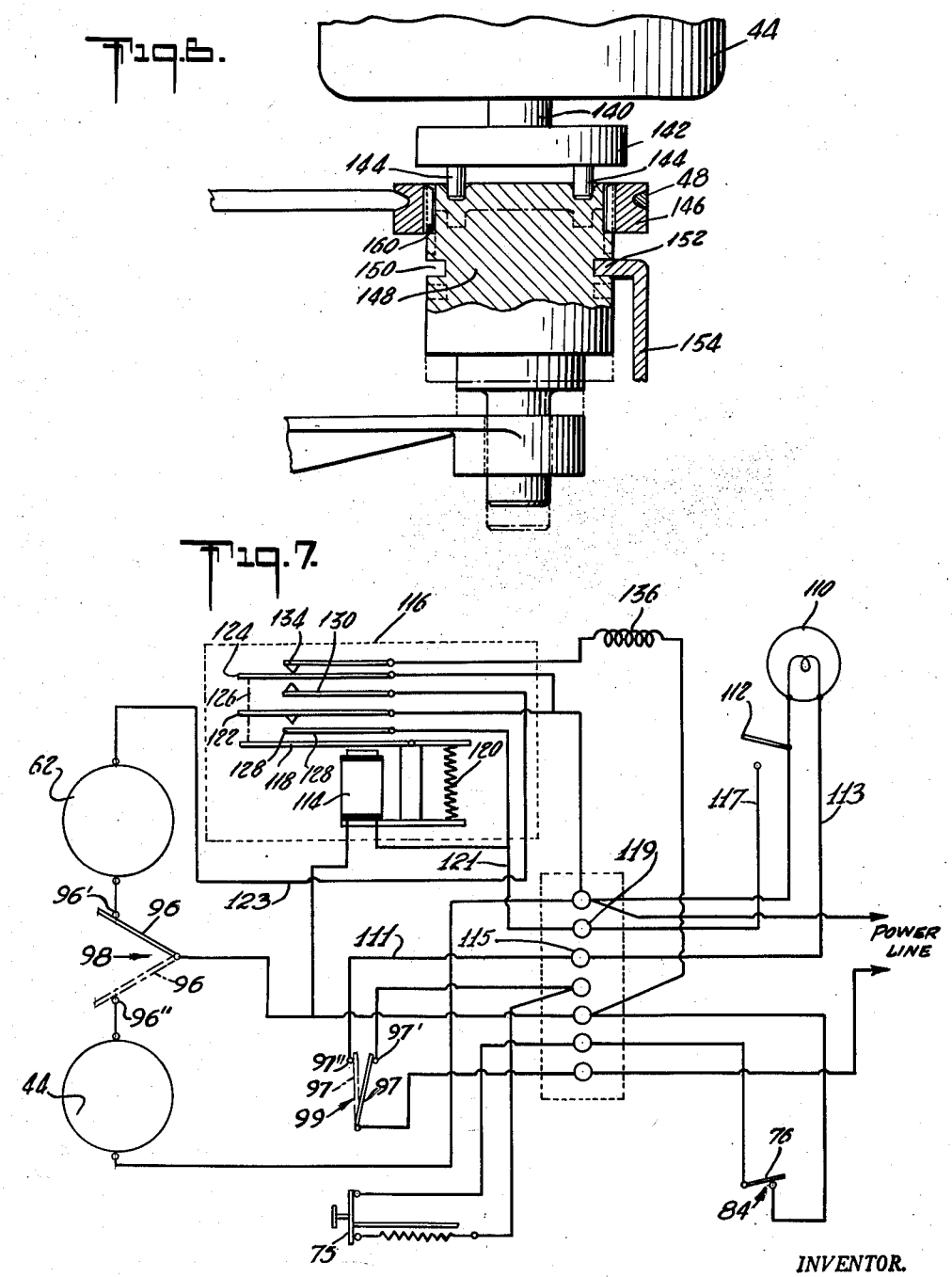

Patented Mar. 24, 1953

2,632,681

UNITED STATES PATENT OFFICE 2,632,681

ARTICLE HANDLING MACHINE

Everett J. Newcomer, Kew Gardens, N. Y., assignor to City Vending Equipment Corp., Maspeth, N. Y., a corporation of New York Application June 30, 1949, Serial No. 102,239

1 Claim. (Cl. 312—71)

The present invention relates broadly to the same type of apparatus as disclosed and claimed in my prior patent Reissue No. 23,103, dated April 26, 1949.

The apparatus disclosed and claimed in said prior patent includes a travelling storage belt which deposits at one time a single row of articles onto a delivery belt which is in the same plane as the storage belt but moving at right angles to the storage belt, the delivery belt dispensing one article or one package at a time in response to coin actuated and electrically controlled circuits.

The main object of the present invention involves the storage feed arrangement in a machine of this general type, and particularly the provision of means, movable with respect to a stationary article supporting platform, to deposit a row of articles onto the delivery belt. An associated main object of the present invention relates to the elimination of the movable storage belt component of prior machines.

Another object of the present invention is the provision of a stationary article storage platform in an apparatus of the character described, having a push bar and means to sweep the pusher bar the length of the platform towards the delivery belt end thereof.

Still another object of the present invention is the provision, in an apparatus of the character described, of a horizontally arranged permanently fixed storage platform adapted to support a plurality of articles thereon, and a movable pusher bar resting atop the storage platform, whereby pressure exerted by the pusher at one end of a number of rows of articles is transmitted from one row to another.

Still another object of the present invention is the provision, in a device of the character described, of a pusher bar atop a stationary storage platform, and endless belt means associated with the pusher, whereby the pusher may be swept along the length of the platform.

Other, further and more specific objects of the present invention will, in part, be pointed out specifically, and in part be obvious from the following description of an illustrative embodiment.

In the drawings annexed hereto and made a part hereof,

Figure 1 is a plan view of one form of storage platform constructed according to and embodying the instant invention, partly broken away to show the motor mounting, clutching mechanism, etc.;

Figure 2 is a side elevational view, also partly broken away and partly in section;

Figures 3, 4 and 5 are sections on the lines 3—3, 4—4 and 5—5 respectively, of Figure 1;

Figure 6 is a detail of the clutch mechanism; and

Figure 7 is a wiring circuit diagram.

In the apparatus of the present invention, a plurality of articles are disposed atop a stationary, horizontally-disposed storage platform, the articles being butted against one another and arranged in rows extending across the width of the platform. A delivery belt is disposed at one end of the platform, the belt moving substantially at right angles to the platform and in the same horizontal plane therewith. When the delivery belt is free of articles thereon, a single row of articles are deposited onto the delivery belt from the storage platform. The delivery belt thereafter will operate to dispense one article at a time. One form of article handling apparatus is broadly disclosed and claimed in my prior patent Reissue No. 23,103, dated April 26, 1949, as are the electrical circuits and controls. The present invention is an improvement thereover in the provision of the stationary storage platform and the shifting of articles therefrom onto the delivery belt.

As used herein, the term "article" indicates any packaged or unpackaged commodity capable of being dispensed in machines of this type, the only limitation being that the articles may be flatly butted one against the other so that pressure at the last of a number of row of units will be transmitted evenly to the first row.

The operating parts of the apparatus, as will be readily understood, are enclosed within a suitable housing, portions of which are indicated as at 5, 5. Housing 5 may be insulated for handling perishables, as foods and the like, as desired.

A supporting frame is provided, consisting of beams 10, 10, 12, 12 secured to suitable brackets 14 mounted on the interior of the housing. A horizontally disposed storage platform 20 is fixed atop the beam supports at the rear of the mechanism, extending lengthwise thereof (Figure 1), platform 20 being of corrugated, zig-zag sectioned metal or the like, as indicated at 22, Figure 3. A pair of lengthwise extending channels 24, 24 are provided through platform 20 whereby a pusher member 26 may be connected to endless belts 28, 28. Pusher 26 comprises a bar of metal or the like, of some height, disposed substantially at right angles across and atop platform 20. A link strip 30 is provided and rivet secured as at 32, to each belt, and also rivet secured at its other end to pusher bar 26, as at 34. Pusher 26 is disposed squarely across platform 20, and is secured to belts 28, 28 in such manner as to maintain same in said right angled relation to the length of platform 20. Belts 28, 28 are provided with spaced apertures, as indicated at 36, 36, the spacing of these apertures along the belt length being such as to coincide with the spacing teeth 38, 38 on drive pulleys 40, 40 so as to be engaged by said teeth 38, 38 and positively driven thereby. Drive pulleys 40, 40 are fixed on a shaft 42 so as to be rotated simultaneously thereby from motor 44 via pulley 46, drive belt 48 and the pulley 50 fixed on shaft 42. A shaft 52 is provided at the opposite end of the frame, suitably supported therefrom, having driven pulleys 54, 54 mounted thereon in line with drive pulleys 50, 50 driven pulleys 54, 54 also having teeth as 38, 38 about their peripheries for positive engagement by the apertured belts 28, 28.

It will, of course, be understood that means other than endless belts, as chains or straps, may be used instead of endless belts to shift pusher 36 from one end of platform 20 towards the delivery belt end thereof.

With pusher 26 at the far end of the apparatus (the extreme right of Figure 1), the articles A, A are deposited on platform 20 in transversely aligned and butting rows. The entire surface area of platform 20 may thus be covered by articles as A, A'. On actuation of pusher 26, and the exertion of pressure against the endmost row of articles as A', the row at the front of the platform is pushed on to a relatively narrow delivery belt of size as to receive said row of articles, the belt being indicated at 60. Endless belt 60 is driven by its own motor 62, through shaft 64, drive pulley 66, belt 68 and driven pulley 70, connected by suitable shafting to a drive roller 67, with belt 60 passing around a driven roller 71 at the opposite side of the apparatus.

The upper flight of belt 60 is supported atop a rigid plate 61 suitably secured to frame 12. The lower flight 60a need not be supported except against undue sagging. In response to the controls to be described below, belt 60 delivers a single article from its front end 72 at one time into chute 74. As the article drops into chute 74, it strikes against cut-off switch operating lever finger 76 which extends into chute 74 and depresses one arm thereof into the dotted line position of Figure 2. Finger 76 is pivoted at 78 and its other arm 77 swings counterweight 80 inwardly against switch actuating arm 82, breaking the circuit at switch 84, shown in normally closed position in full lines in Figure 7, and stopping all operation within the apparatus. The container dropping through chute 74 comes to rest in a receptacle from which it may be removed from the apparatus. A conventional thermal cutout 75 is included in the circuit, and is normally closed as will readily be understood.

With a row of articles A along the length of delivery belt 60, a signal arm 86 component of a lever is supported thereby in the upwardly angled position shown in Figures 2 and 4. Arm 86 extends the full length of belt 60, so that even one article A thereon, will serve to keep arm 86 in its upright position. Arm 86 is pivoted at 88, and its other arm 90 extends downwardly and angles inwardly as at 92 and has a cross arm 93 bearing against an arm 94 spring pressed upwardly (see Figure 4) normally to maintain contact between contact button 96 and contact 96' of delivery motor 62. When all the articles on belt 60 have been dispensed, the then unsupported arm 86 pivots downwardly, swinging arm 92, which thereupon drops into the dotted line position of Figure 4, closing the contact between arm 94 and contact 96" of switch 98, as shown in dotted lines in Figure 7, wherein button 96 is depressed into contact with storage motor contact 96", and energizing motor 44 to actuate the pusher bar 26 so as to move another row of articles A onto delivery belt 60, thereby raising arm 86 and restoring the circuit to normal position shown in full lines to thereby stop motor 44. The movement of rows of articles from platform 20 onto belt 60, and the making and breaking of the circuits via arm 86 to switch 98 will continue intermittently until there are no more articles on either platform 20 or belt 60.

A single flap arm 100 mounted on the frame at the rear end of the platform adjacent delivery belt 60, is adapted to be held upright so long as there are any articles on platform 20 in which position switch button 97 is closed in circuit with contact 97' as shown in full lines in Figure 7. When all the articles on platform 20 have been shifted onto belt 60, flap 100 drops over, and when flap 86 as well drops over (when the last article on belt 60 has been dispensed), arm 100 is thereby permitted to swing downwardly into the position of Figure 5, whereat cross-arm 93 will bear against arm 95 and depress contact 97 to break the motor circuits from the normal position at switch 99, as shown in full lines, to the dotted line position in Figure 7, wherein button 97 closes the circuit to contact 97", thereby energizing empty condition light signal lamp 110 via wiring 111, 113 across connection 115.

In Figure 4, the dotted line position of arm 92, indicates the closure of the contact with arm 94, when the delivery belt 60 alone is empty. In Figure 5, I have illustrated the situation when, in addition, flap 100 is unsupported by any articles on empty platform 20, in which positions the entire machine is void of articles. The cross arm 93 fixed to the end of arm 92 will depress both arms 94 and 95, thereby closing the circuit through contact switch button 97 to contact 97". This energizes empty light 110 and opens the main line circuit to the machine, completely de-energizing the unit except for the warning light.

Assuming the storage platform to be fully loaded with rows of articles A, A, the purchaser deposits a coin into a suitably located slot (not shown) which closes the circuit at coin switch 112 via wiring 117, connection 119 and wiring 121 to electromagnet 114 of relay 116. When electromagnet 114 is energized, its armature 118 is drawn towards and in contact with it against the resistance of spring 120. Switch blades 122 and 124, connected to armature 118 is indicated at 126, and the medium contacts 128 and 130 are brought into contact respectively with blades 122 and 124 in the relay 116. The closure between blade 122 and contact 128 keeps the electromagnet 114 energized, and with blade 124 closed with contact 130, delivery motor 62 is energized via wiring 123 to deliver a single article into chute 74 until, by action of tripper 76, the circuit is broken at switch 84 and motor 62 de-energized. At the same time, all current is cut off from electromagnet 114, permitting armature 118 to swing away from magnet 114 in response to the normal biasing of spring 120. Simultaneously, blades 122, 124 would shift away from medium contacts 128, 130 respectively in relay 116, permitting the making of contact between blade 124 and end contact 134, which is normally closed. The machine is thus ready for another cycle of operation in delivering an article to chute 74.

The normal circuit closure between blade 124 and end contact 134 energizes coin block magnet 136 of the coin mechanism (not shown) permitting coins to pass through the machine. When electromagnet 114 is energized, blade 124 and contact 134 are in open circuit condition, de-energizing coin block magnet 136 and releasing its armature to bar the coin chute against the insertion thereinto of additional coins. The same condition prevails when the machine is empty, it being necessary to energize coil 136 before a coin can be accepted by the machine.

When all the articles originally disposed atop platform 20 have been dispensed from the apparatus, as will be indicated by tell-tale signal light 110, and the storage platform is to be reloaded, pusher 26 must first be shifted to its starting position at the extreme right hand side of the apparatus. How this is accomplished is illustrated in Figures 1 and 6.

Motor drive shaft 140 has secured thereto a clutch plate 142, provided with outwardly extending studs 144, 144. Pulley 46 has recesses 146 thereon to engage studs 144, 144 to maintain driving engagement. A laterally slidable collar 148 is provided having an annular groove 150 engaged by an arm 152 of shift rod 154. Rod 154 extends outside beam 10 and is normally urged forwardly by normally expanding coil spring 156 interposed between beam 10 and a plate 158 fixed on rod 154. Thus, when rod 154 is pulled out, against the normal biasing of spring 156, clutch plate 142 is disengaged from collar 148, permitting belts 28, 28 to be shifted freely, thereby permitting the resetting of pusher 26 to starting position. Collar 148 has a toothed interfit with pulley 46 when in the full line position of Figure 6, as indicated at 160, but when the collar is withdrawn, the interfit is broken and the pusher can be reset, either manually or otherwise, as convenient or as desired.

Delivery belt 60 and pusher 36 need not be absolutely normal to the length of platform 20, so long as the width of delivery belt 60 is sufficient to receive the single row of articles deposited thereon at one time from the storage platform. In practice, I have found that some slight angular displacement does not interfere with the efficient operation of the mechanism.

I claim:

An article delivery mechanism comprising an endless conveyor belt having a longitudinal horizontal upper run, an article storage platform extending laterally from said conveyor and having an article supporting surface substantially coplanar with the upper horizontal surface of said conveyor belt, said storage platform having a zig-zag vertical transverse cross-section, a movable article pusher element mounted above said platform and extending substantially the width thereof, and means for advancing said pusher element along said platform toward said conveyor belt, said means comprising endless belts positioned below the platform and inwardly of the side edges of said platform.

EVERETT J. NEWCOMER.

REFERENCES CITED

The following references are of record in the file of this patent:

UNITED STATES PATENTS

| Number | Name | Date |
| --- | --- | --- |
| Re. 23,103 | Newcomer | Apr. 26, 1949 |
| 190,211 | Gustin | May 1, 1877 |
| 1,200,508 | Lister | Oct. 10, 1916 |
| 1,905,180 | Lowther | Apr. 25, 1933 |